(12) United States Patent
Sen

(10) Patent No.: US 11,326,577 B2
(45) Date of Patent: May 10, 2022

(54) WIND AND WATER TURBINE APPARATUSES

(71) Applicant: Dipak Kumar Sen, Mississauga (CA)

(72) Inventor: Dipak Kumar Sen, Mississauga (CA)

( * ) Notice: Subject to any disclaimer, the term of this patent is extended or adjusted under 35 U.S.C. 154(b) by 0 days.

(21) Appl. No.: 17/142,774

(22) Filed: Jan. 6, 2021

(65) Prior Publication Data

US 2021/0246870 A1    Aug. 12, 2021

Related U.S. Application Data

(60) Provisional application No. 62/971,343, filed on Feb. 7, 2020.

(51) Int. Cl.
*F03D 3/06* (2006.01)

(52) U.S. Cl.
CPC ........ *F03D 3/067* (2013.01); *F05B 2240/215* (2013.01)

(58) Field of Classification Search
CPC ........................... F03D 3/067; F05B 2240/215
See application file for complete search history.

(56) References Cited

U.S. PATENT DOCUMENTS

| | | | | |
|---|---|---|---|---|
| 2,107,690 A | * | 2/1938 | Clark | F03D 3/068 |
| | | | | 416/32 |
| 4,218,183 A | * | 8/1980 | Dall-Winther | F03D 3/067 |
| | | | | 416/119 |
| 4,496,283 A | * | 1/1985 | Kodric | F03D 3/067 |
| | | | | 416/119 |
| 4,684,817 A | * | 8/1987 | Goldwater | F03D 3/067 |
| | | | | 290/55 |
| 5,525,037 A | | 6/1996 | Cummings | |
| 6,734,576 B2 | * | 5/2004 | Pacheco | F03B 17/065 |
| | | | | 290/55 |
| 9,605,655 B2 | | 3/2017 | Min | |
| 2014/0227094 A1 | | 8/2014 | Xia | |

FOREIGN PATENT DOCUMENTS

| | | |
|---|---|---|
| DE | 4123750 A1 | 1/1993 |
| FR | 2396878 A1 | 2/1979 |
| KR | 19990068708 A | 9/1999 |
| KR | 20100091740 A | 8/2010 |
| WO | 2010121485 A1 | 10/2010 |
| WO | 2013045958 A1 | 4/2013 |

* cited by examiner

*Primary Examiner* — Eldon T Brockman
*Assistant Examiner* — Brian O Peters
(74) *Attorney, Agent, or Firm* — Bereskin & Parr LLP/S.E.N.C.R.L., s.r.l.

(57) ABSTRACT

A fluid turbine apparatus includes a fixed structure and a rotating structure supported by the fixed structure. The rotating structure includes a central shaft, and at least two wings connected to the central shaft. Each of the wings includes a wing frame, at least one door and a respective at least one door stopper. Each of the doors pivots relative to the respective wing frame between closed and open positions. In use, the door located at one side of the central shaft facing a flow of fluid is in the closed position with fluid force transferred to the door, while the door located at the opposite side of the shaft is in the open position with fluid passing through the respective wing frame. The fluid force creates a torque that rotates the central shaft. Apparatuses can extract power from wind or water current.

20 Claims, 17 Drawing Sheets

WIND AND WATER TURBINE APPARATUSES

CROSS-REFERENCE TO RELATED APPLICATION

This application claims priority to U.S. Patent Application No. 62/971,343 filed Feb. 7, 2020, the entire contents of which are hereby incorporated herein by reference.

FIELD

The present disclosure relates generally to wind and water current power generating devices.

BACKGROUND

The following paragraphs are not an admission that anything discussed in them is prior art or part of the knowledge of persons skilled in the art.

Regarding deriving electrical power from wind, common and commercially used windmills can use propeller blades mounted on a horizontal shaft. The blades rotate on a horizontal axis as the wind sweeps through the blades. The rotor support, which also can move on a vertical axis, is rotated by wind itself through use of vanes or through a yawing mechanism to make the propellers face the wind. A motor generator can be integrally mounted on the horizontal rotor shaft with appropriate gear box together with coupling, braking mechanism, etc., to convert the mechanical energy generated by the wind into electrical power. The entire assembly of propeller, gear box, generator, braking mechanism, coupling, etc., are supported at the top of a mechanical tower and the blades rotate on a vertical plane.

For very large power generation, the blades become big and heavy. The supporting structure can present problems for design because of stresses generated by the rotating blades. The size and weight of the blades, their fabrication, transportation and installation can become a challenging task for the project. Operation and maintenance of the power generating equipment, especially in remote areas, can also create problems. These problems can also limit the power that can be produced from a single windmill in remote areas.

There are historic windmills with horizontal axis rotors containing multiple flat blades where the blades move only within a fixed plane. The blades are positioned such that they face the prevailing wind direction for the area. The wind direction of these areas remains substantially fixed for that area for a substantial period of time within a year.

In another kind, vertical axis rotors or turbines are sometimes used. For this kind, the rotors can have their axes perpendicular the wind flow (at right angle to the earth's surface). These rotors are capable of accepting wind from any direction and, thus, will not need any positioning device to face the wind. Examples of these kinds are Darrieus rotors and Savonius rotors.

Machines were built centuries ago by attaching sails to a central vertical post to be whirled around by the wind coming from any direction. Flexible fabrics, such as canvas were used as sails. The sails were positioned around a central post such that wind hitting the sail at various angles will produce a resulting torque to rotate the post. In some old windmills, the sails were partially shielded by walls. The wind rushes through a slot in the walls to whirl the sails like modern day revolving doors.

Regarding deriving electrical power from water current, viable commercial technology to extract power directly from a body of moving water is lacking. Present technology utilizes installing dams on streams or rivers and installing water turbines to derive power from the static head of water of the reservoir the dam has created. A large area of land is submerged to create a reservoir to hold the water and the water is released at the bottom of the reservoir to the turbines for generating power. Besides loss of land, such approaches can have a negative effect on the environment and community.

As far as oceans are concerned, there is untapped potential to generate a large amounts of electrical power. Currently, there is no viable commercial technology to extract this power. Attempts have been made to install turbines under the water to generate power. These turbines have blades that rotate by the lift or drag forces exerted by the moving water. Other mechanisms, such as compression of air through the wave action, etc., have also been considered.

Watermills were known to have been used centuries ago. These machines were used to grind grains. A large diameter wheel, with horizontal axis and having vanes or paddles at the circumference, has its lower part immersed in a stream of water. The force of the water on the paddles turns the wheel, which, in turn, rotates the millstone.

BRIEF DESCRIPTION OF THE DRAWINGS

The drawings included herewith are for illustrating various examples of apparatuses and methods of the present disclosure and are not intended to limit the scope of what is taught in any way. For simplicity and clarity of illustration, where considered appropriate, reference numerals may be repeated among the drawings to indicate corresponding or analogous elements. In the drawings.

DETAILED DESCRIPTION

Figure 1:
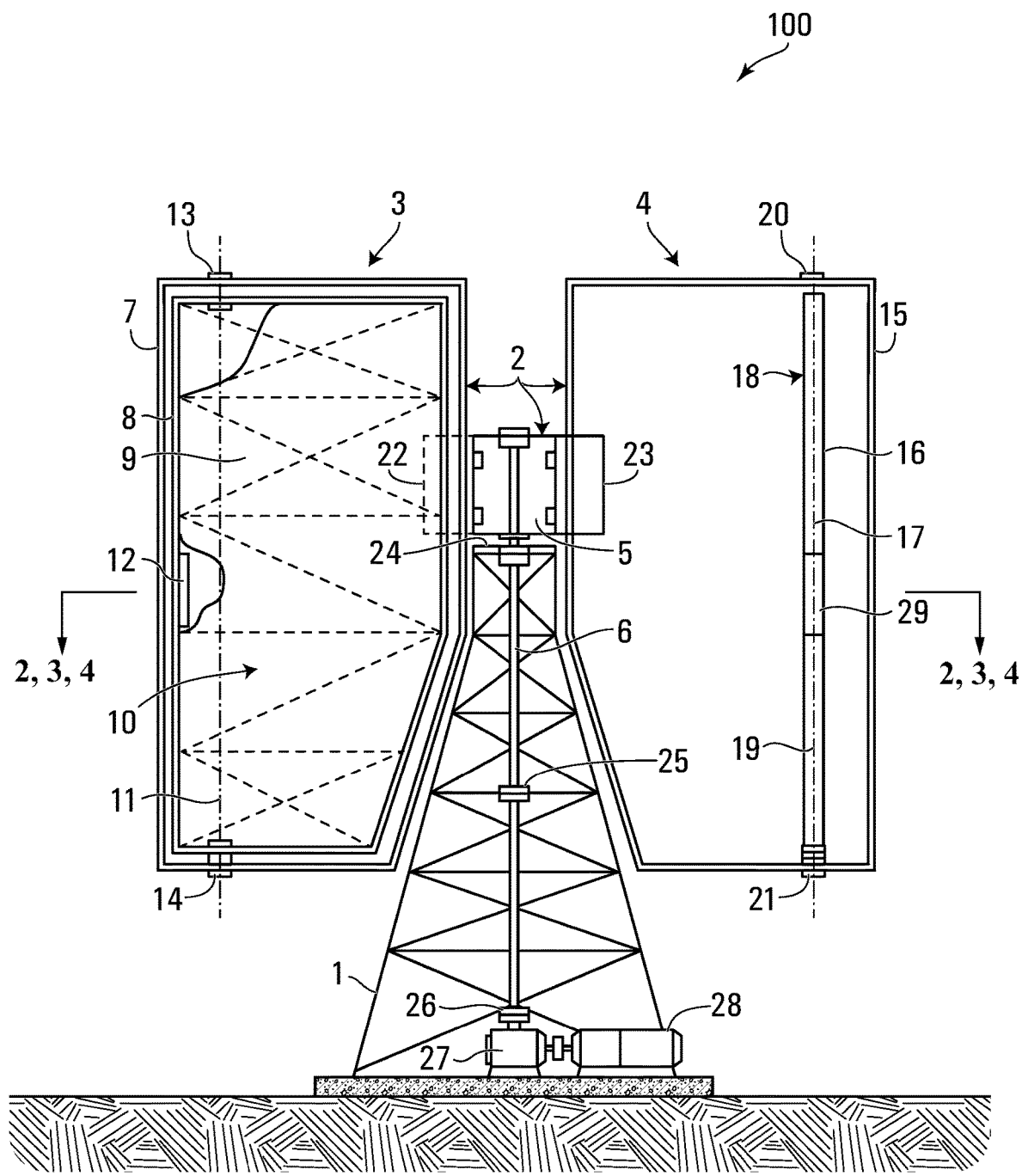
FIG. 1 is a schematic view of a first fluid turbine apparatus.

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

There is abundance of power in the wind, ocean, rivers and streams in nature. The current technology has not progressed sufficiently to make effective utilization of these vast resources that are available. The technology of present disclosure is an attempt to harness pollution-free power from the wind, oceans, rivers and/or streams. In a first aspect of the present disclosure, the extraction of power from wind will be described. In second aspect of the present disclosure, the extraction of power from water current (e.g. streams, rivers, oceans, etc.) will be described.

In accordance with the first aspect, a wind power device can be built with low cost sail and structural materials. The apparatus can consist of two parts—a rotating structure and a fixed structure. The rotating structure can consist of two or more wings integrally connected to a vertical shaft. The shaft can be supported by the fixed structure, which can permit the shaft to be rotated about its longitudinal axis.

Sails on opposite sides of the central shaft can be automatically manipulated by the wind itself to generate a torque for rotating the central shaft. The design is flexible such that large or small mechanical or electrical power can be conveniently generated. Propeller or other types of blades as commonly used in current windmills are not required.

Teachings of the present disclosure can provide means to harness wind energy to produce clean electrical and/or mechanical power with low cost and low technology construction materials, including low cost "sails", which can be readily available all over the world. Such windmills can be capable producing power of commercial proportions at lower capital and operating cost and at higher efficiencies of conversion of wind power to useful energy source compared to current systems.

Teachings of the present disclosure can also eliminate the use of propeller blades, as these blades can be heavy, difficult to fabricate, transport, install and operate for a large-scale wind-operated power plant. For example, a propeller type wind power generator of 1 MW may require a rotor diameter of 50 to 60 meters, thereby imposing enormous weight and logistical challenges. The blades rotating at considerable speed can also be harmful to birds. They pose danger to life and property, if they break in operation.

The design of the vertical support structure for propeller-type windmills, mostly used in present days for power generation, requires considerable design considerations because of the huge size and weights of commercial propeller blades and the stresses created by the rotating blades. Variation in wind velocities in vertical and horizontal directions, shadowing effects of propeller blades on the structure and vice-versa, the weight of the propeller blades, etc., are some of the items contributing to these stresses. Much less design considerations can be required to design the fixed structure and rotating structure of the present disclosure. Therefore, teachings of the present disclosure can overcome the current design problems with propeller-type windmills for large-scale power production.

Teachings of the present disclosure can further provide an ecologically-friendly wind power apparatus that is less harmful to birds, since there can be no sharp blades, rotating at high tip velocity to harm birds.

Teachings of the present disclosure can yet further provide for the capability to produce considerable power even at low wind velocity for on-shore or off-shore wind mills.

Teachings herein can permit installation of the power trains including gear box, coupling, flywheel, braking mechanism, motor generator, etc., all at the ground level. For the propeller-blade type, this power train is installed at the center line of the blades' horizontal axis, at considerable height from ground level. This can cause significant difficulties for installation, maintenance, operation and dismantling. The power train of the apparatus can be located at the ground level, which can simplify the design of both the support and rotating structures. Installation, maintenance and repair of the power train can be convenient, efficient and less expensive.

Towards these and other ends, in some examples of the present disclosure, an apparatus can consist of a rotating structure with an integral central shaft, and a vertical structure to support the central shaft with appropriate bearings and restraints. The energy of the rotating structure can be converted into useful mechanical or electrical power. The fixed structure does not interfere with the rotating structure. In some examples, the rotating structure can be provided with additional support, e.g. wheels moving on a fixed track, with the track being supported directly from the ground or from the fixed structure itself. In some examples, other low-noise devices can be considered for supporting the moving structure to facilitate its rotation.

Variation of wind speed in vertical and/or horizontal directions and wind gusts can require considerable design considerations for the design of propeller blades and their support structure, and require strengthening of these items. In examples of the present disclosure, all wind forces, irrespective of variations in vertical and horizontal direction, are collected on the impingement surfaces to produce a cumulative torque to rotate the entire rotating assembly.

In some examples, the rotating structure can include two or more wings integrally connected to a central shaft. As a result, the entire rotating structure can rotate as one piece with the shaft. If only two wings are used, they can be located diametrically opposite from one another relative to the central shaft. If more than two wings are used, they can be disposed spaced apart evenly about the central shaft.

In some examples, the wings can include doors configured to pivot about a vertical axis, eccentrically within a door frame. The pivot can be located towards the outer edge from the center line of the door. The door itself can be made as a frame and the frame can be covered by a textile sail, e.g. canvas or fabric made from nylon, polypropylene or other synthetic or natural fiber material, suitable for the climate and capable of withstanding the wind force. Alternatively, the door can be made of lightweight materials constructed of plastic, wood, metal, fiber-reinforced plastic, or other material selected for durability, strength and capable of withstanding the wind force.

In some examples, the doors are provided with door stoppers such that the door can only open away from the stopper. The stoppers are arranged such that the door at one end facing the wind is closed at the stopper with wind force transferred to the door, while the door on the opposite side of the shaft opens away from the stopper along the direction of the wind. Positioning of the stoppers on the door frame will control clockwise or counterclockwise movement of the rotating structure. Wind force acting on the closed doors on one side of the central shaft creates a torque that rotates the rotating structure. At the opposite wing, the wind force will open the doors away from the stopper to allow the wind to pass through the opened door, and no opposing torque will be created at the open door. If the doors on both sides of the shaft open, the rotating assembly can stall as no motive force will be created to rotate the shaft, except for the imbalance in the wings.

With the arrangement described above, the apparatus can face wind from any direction and the forces exerted on all the doors of the same wing are combined to provide a torque to rotate the entire structure. The opening and closing of the doors of each wing can be controlled by the wind itself and no additional positioning mechanism will be required.

In some examples, if the wind speed exceeds a desired design threshold, brakes could be switched on automatically to reduce the speed of the rotating structure. In some examples, at least some or all of the doors on the driving wing can have their stoppers automatically disengaged from the closed position so that these doors will open. As a result, the wind torque can be decreased to reduce the speed of the rotating structure. These safety features can be computer-controlled and as well as the brakes can be used in an emergency.

Figure 6:
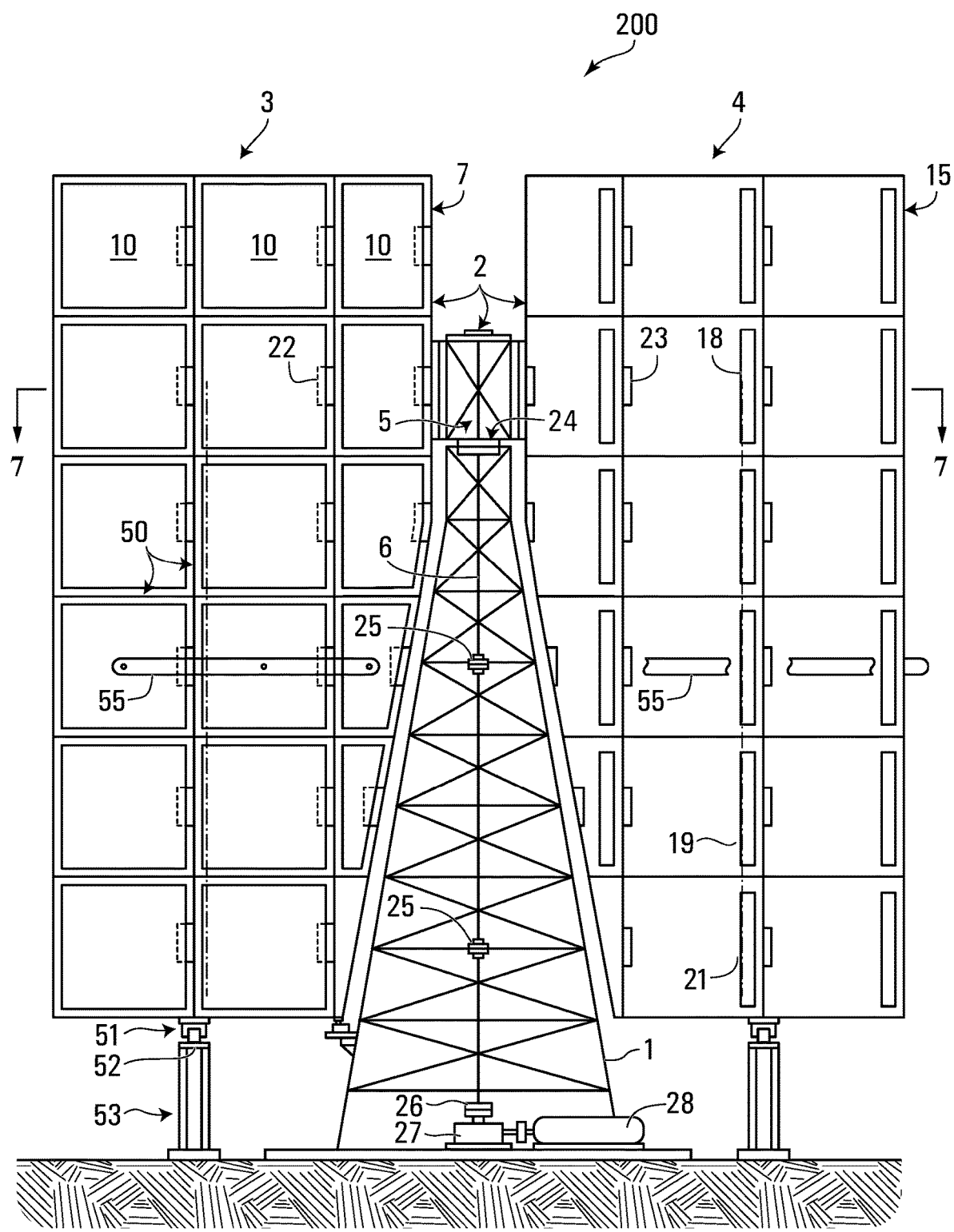
FIG. 6 is a schematic view of a second fluid turbine apparatus.

In some examples, the wings can each consist of a plurality of doors, instead of a single large door for each wing (see FIG. 6). Each smaller door can be housed within its own frame. Stoppers are provided for each door and operation will be the same as described above. In such examples, construction, installation and operation of the rotating structure can be simpler and less expensive compared to a large single door that would otherwise be required for a wing, for example, having thousands of square feet of sail area. A single door may also be too heavy to be supported on hinges, too heavy to be functional and can create enormous force on the stopper when wind closes the door. On the other hand, the cross-sectional area of multiple door frames can reduce the torque, and therefore the power produced can be slightly less compared to a single door design.

For large wind or water powered machines of the present disclosure, it can be convenient to install a pony motor with the powertrain of the apparatus to facilitate rotation of the wings through an external power to overcome the starting inertia. This will also allow for testing the operation and performance of various parts of the device prior to putting the machine in to operation.

In some examples, the apparatus can be suitable for large-scale power generation (for example, up to 1 MW of electrical power generation, or more), with each wing having a cumulative sail area of thousands of square feet. Additional support can be provided for the rotating structure from below by wheels at the bottom of the wing frame, or by other mechanisms, such as magnetic pads, or the entire frame moving on a fixed track. Air bearings and/or magnetic levitation can be used to reduce friction at such support mechanisms. Other means of supporting the wings are possible.

Figure 11:
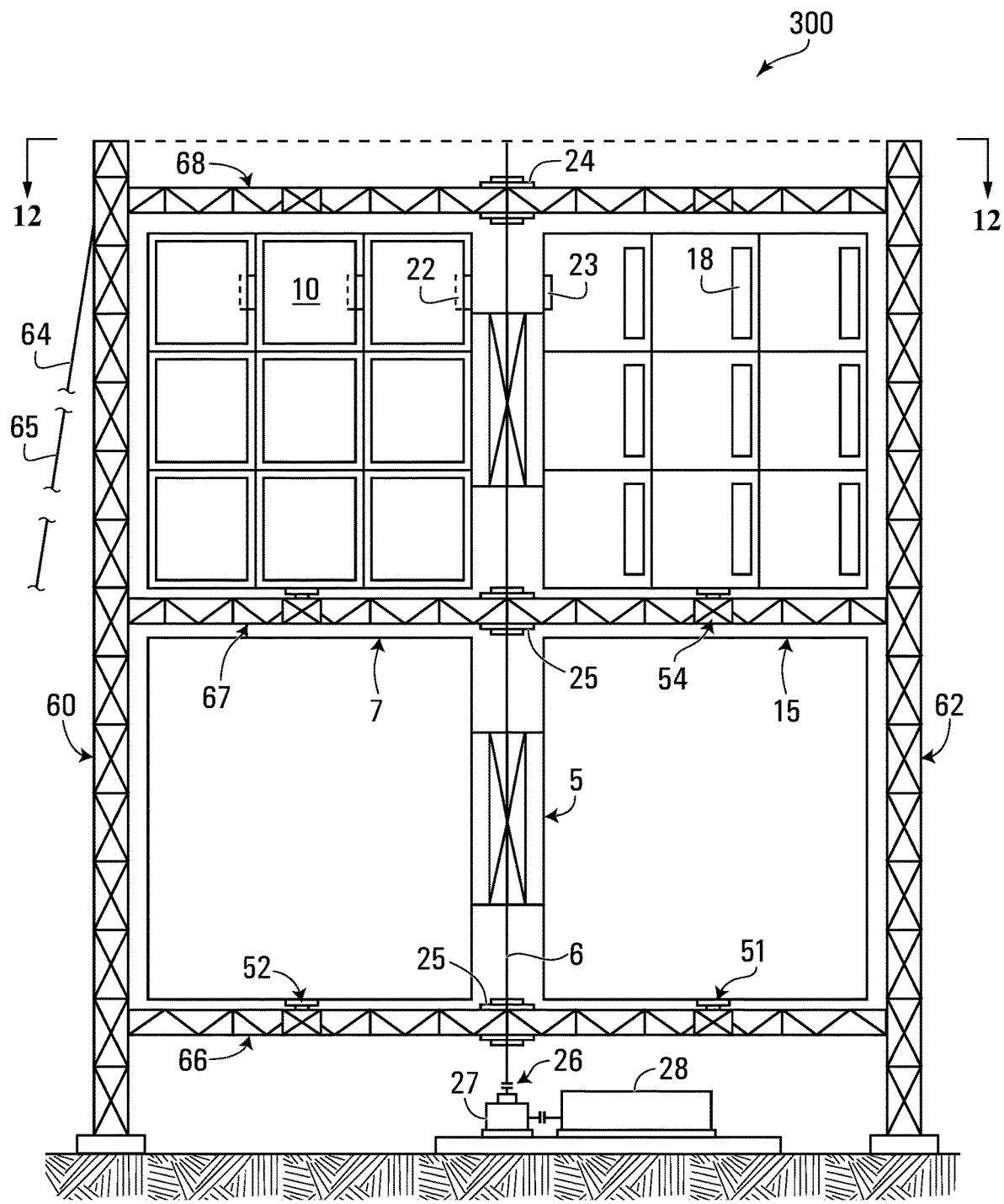
FIG. 11 is a schematic view of a third fluid turbine apparatus.

In some examples, support for the wings can be provided about their periphery instead of only at a central location (see FIG. 11). The peripheral structure can include support towers and horizontal bridges connected between the towers (see FIG. 12). The horizontal bridges can be arranged at multiple elevations so that multiple wings are vertically stacked. The wings can be supported by wheels that move on tracks mounted between to the bridges. Torque produced at each level of the bridges can be transmitted to the central shaft and the power produced at each level will be cumulative. The power train can be installed at the bottom of the shaft, i.e. at ground level. The peripheral structure can be further supported by guy wires.

Figure 2:
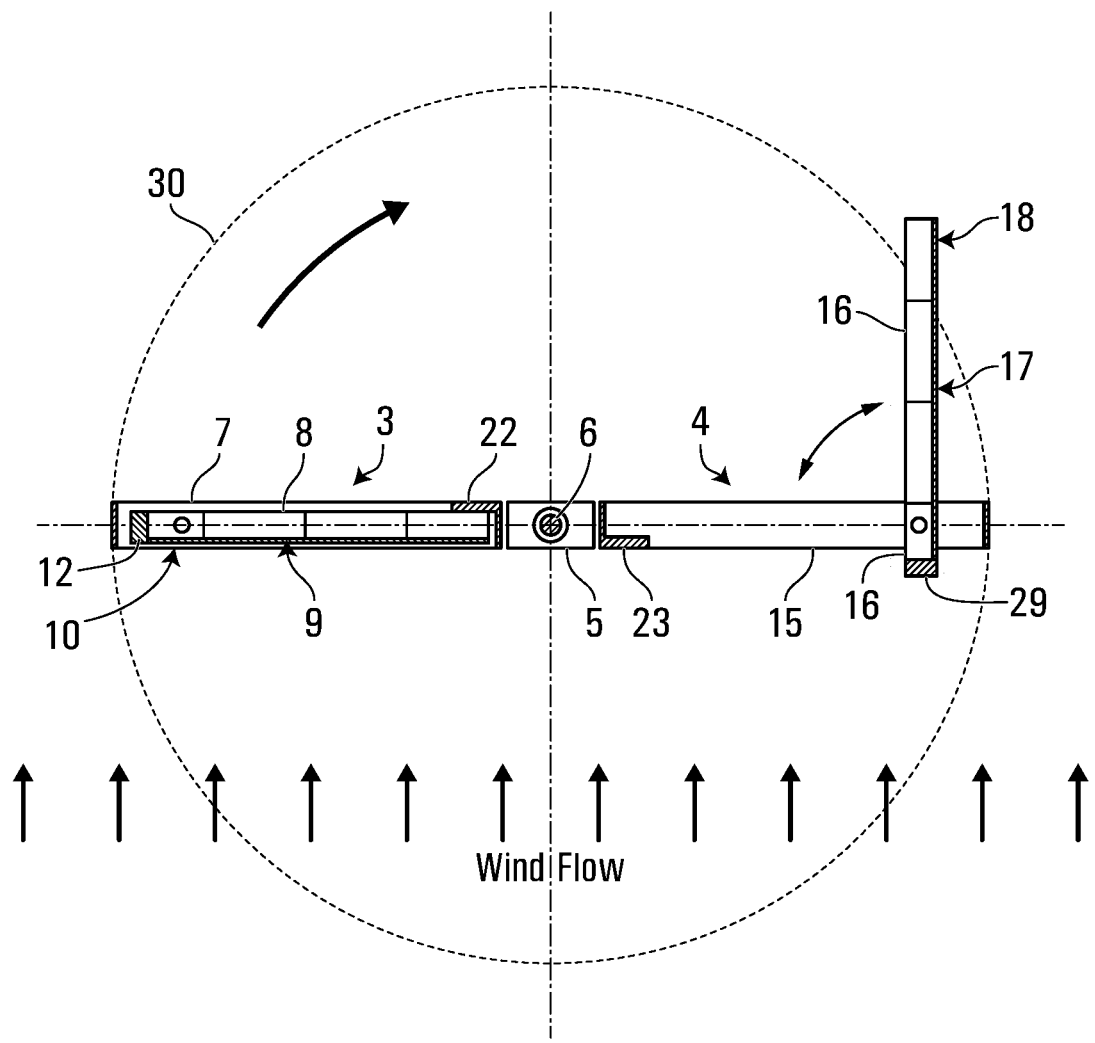
FIG. 2 is a sectional view of the fluid turbine apparatus of FIG. 1, in which a rotating structure is arranged to move in clockwise rotation.

Referring to FIG. 1, an exemplary fluid turbine apparatus is shown generally at reference numeral 100. The apparatus 100 can be used to power a small boat or a water pump, or other devices requiring mechanical or electrical power. The apparatus 100 is shown to include a fixed structure in the form of a support tower 1, and a rotating structure 2. The rotating structure 2 is an integral assembly including wings 3, 4, a connecting member 5 and a shaft 6. The central shaft 6 is rotatable about a vertical shaft axis. The wings 3, 4 extend radially outwardly relative to the shaft 6, and are coupled to the shaft by the connecting member 5. FIG. 2 shows the wings 3, 4, the connecting member 5 and the shaft 6 arranged to move in clockwise rotation.

Referring to FIGS. 1 and 2, the wing 3 consists of a wing frame 7, a door frame 8 and sail 9. The door frame 8 together with the sail 9 constitutes a door 10. In the example illustrated, the door 10 can pivot within the wing frame 7 along a vertical door axis 11 between an upper pivot 13 and a lower pivot 14. Similarly, the wing 4 consists of wing frame 15, a door frame 16 and a sail 17. For wing 4, the door 18 can pivot within the wing frame 15 along a vertical door axis 19 between an upper pivot 20 and a lower pivot 21.

In the example illustrated, the door 10 includes a stopper 22, such that the door 10 can only open towards the reader (against the direction of wind flow), and the door 18 includes a stopper 23, such that the door 18 can only open away from the reader (with the direction of wind flow). The stoppers 22, 23 can be cushioned to absorb the impact of the doors 10, 18.

The shaft 6 can be integral with the wings 3, 4 and the connection member 5, and can be supported vertically by bearings 24, 25 of the support structure 1. In the example illustrated, the shaft 6 is connected to a power train including a gear box 27 via a coupling 26. The gear box 27 is shown connected to a motor generator 28 for electrical power. Power can transmitted from the rotating structure 2 via the shaft 6 to the motor generator 28. In some examples, the apparatus 100 can also be used to generate mechanical power. The details of such electrical and/or mechanical transmission can be selected appropriately, depending on the implementation.

Referring to FIG. 2, the wing 3 is shown at a 9 o'clock starting position and the wing 4 is shown at 3 o'clock starting position. As the wind flows in the direction shown towards the apparatus 100, the door 10 located at one side of the central shaft 6 will engage the stopper 22 in a closed position. The door 18 located at the opposite side of the shaft 6 will be in an open position spaced away from the stopper 23 and can align with the direction of flow. The wind force exerted on the door 10 generates a turning moment, which can cause the rotating structure to rotate in a clockwise direction having a circle of rotation 30. Because the door 18 is open and allows the wind to pass through, no effective force is generated at this door to cause an opposite torque. Wind acting on the exposed edge of the door 18 will produce an anti-clockwise torque that can be negligible compared to the clockwise torque produced at door 10. Wind force acting on wing frames 7, 15 can balance each other and will not contribute to the torque produced.

As the doors 10, 18 move away from the starting positions, varying degrees of wind force exerted on the doors 10, 18 as well as momentum of the moving doors 10, 18 can cause continuous rotation of the entire moving structure in the clockwise direction. With 180 degrees of rotation, the positions of the wings 3, 4 will be reversed. The door 18 will now be shut closed and the door 10 will be open. This cycle can continue accordingly, as exposed surfaces of the doors 10, 18 in any position will catch the wind and cause the structure to rotate. Therefore, the apparatus 100 does not need a yawing or positioning mechanism to account for the wind direction, which is required for typical windmills with rotating blades.

The doors 10, 18 can be balanced within the frame 7, 15 along the axes 11, 19 with counter weights 12, 29, respectively. Balancing can make the doors 10, 18 more responsive at lower wind velocities to orient to their respective positions. In the example illustrated, the axes 11, 19 are positioned eccentrically relative to the frames 7, 15, and close to outer edges of each frame. In some examples, the axes can be positioned approximately two thirds of the way from the inner edge to the outer edge of the doors. In some examples, the axes can be positioned as close as possible to the outer edge while at the same time permitting effective balancing of the doors along the vertical pivoting axis.

Figure 3:
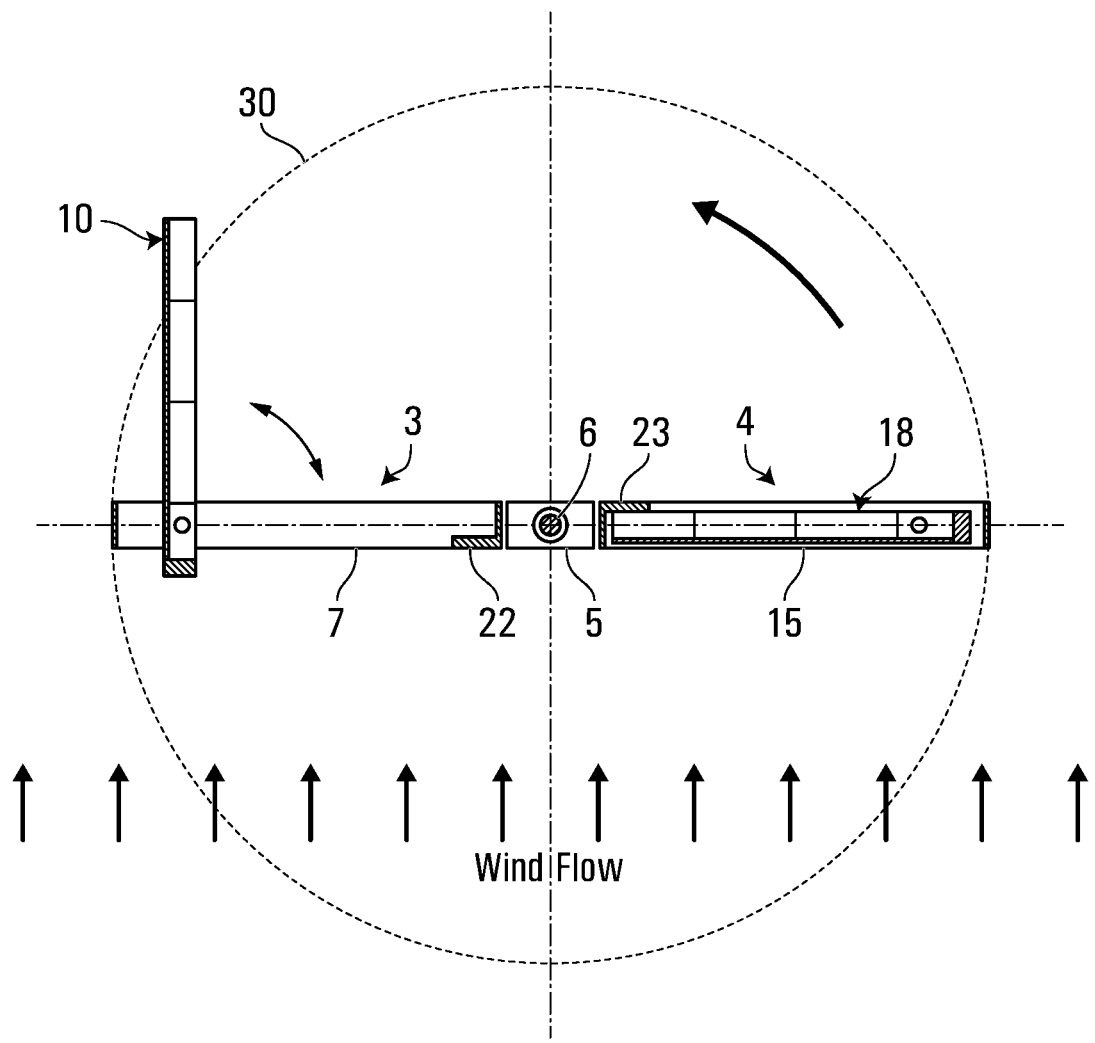
FIG. 3 is a sectional view of the fluid turbine apparatus of FIG. 1, in which the rotating structure is arranged to move in counterclockwise rotation.

FIG. 3 shows the wings 3, 4, the connecting member 5 and the shaft 6 arranged to move in counterclockwise rotation. The wind force exerted on the door 18 generates a turning moment, which can cause the rotating structure to rotate in a counterclockwise direction having a circle of rotation 30. Because the door 10 is open and allows the wind to pass through, no effective force is generated at this door to cause an opposite torque.

Figure 4:
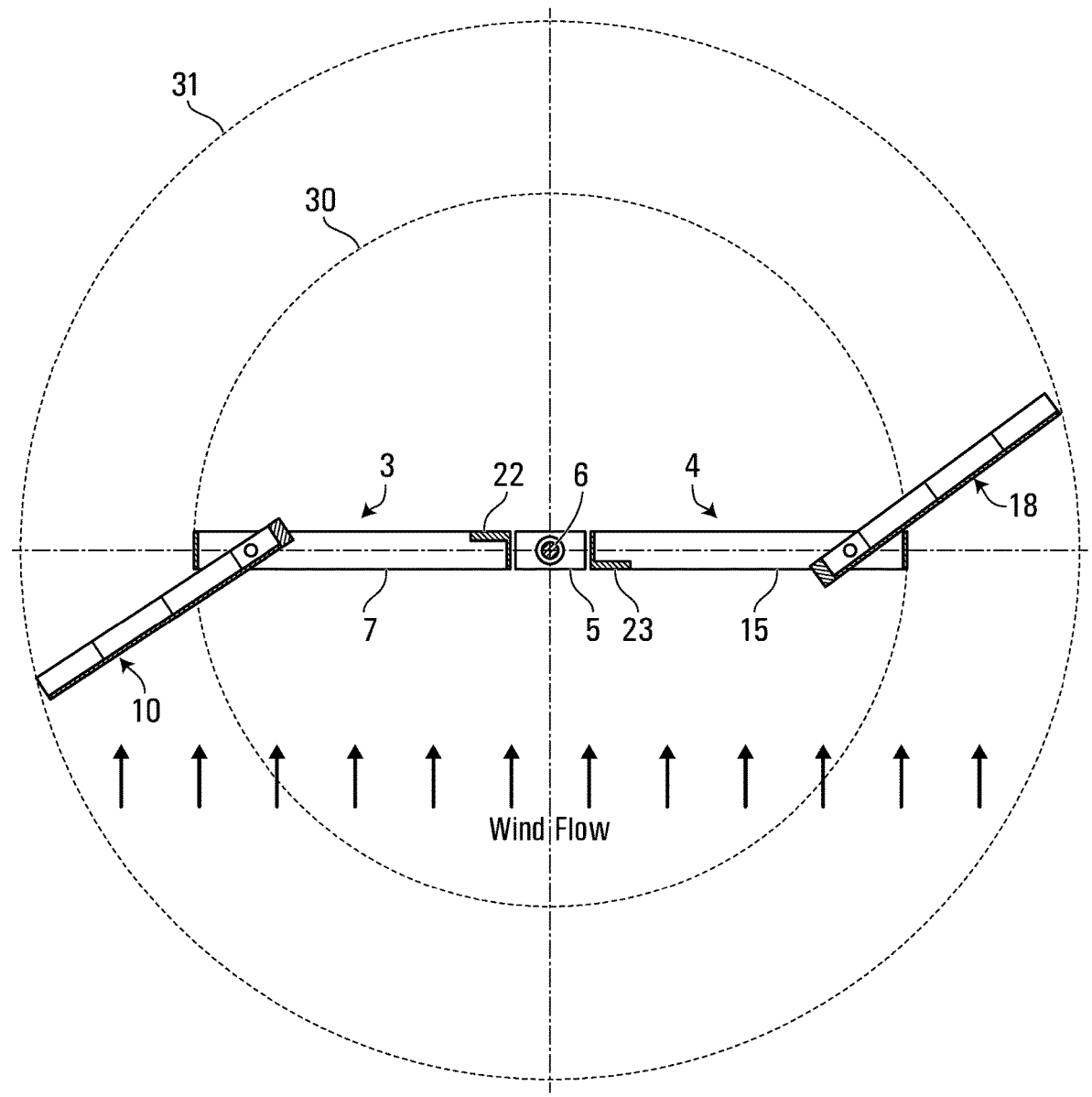
FIG. 4 is another sectional view of the fluid turbine apparatus of FIG. 1, showing alternate positions of doors of the apparatus.

FIG. 4 shows the door 10 in an alternative position. In use, strong and erratic wind could swing the doors 10, 18 to the positions shown. Although the wind will pass through the wing frame 7, the wind force exerted on the door 10 will have additional leverage and can cause the rotating structure to rotate in a clockwise direction with an extended circle of rotation 31. The circle of rotation can be 30 or 31, depending on the wind flow pattern. In some examples, appropriate stoppers can be used to limit the circle of rotation to 30.

Figure 5:
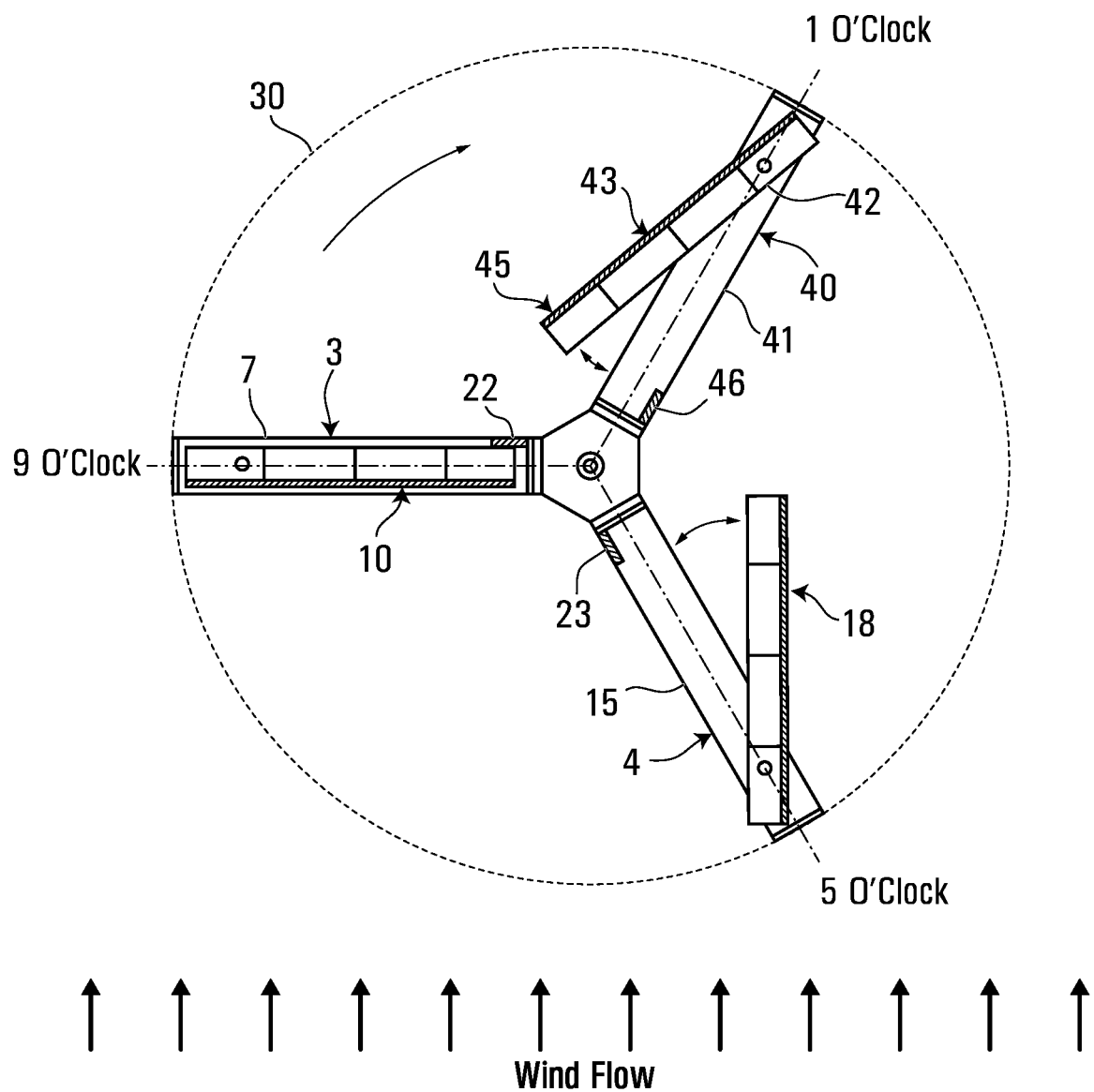
FIG. 5 is an alternative sectional view of the fluid turbine apparatus of FIG. 1, in which the rotating structure has three wings instead of two.

In the example shown in FIG. 5, the rotating structure has three wings instead of two. In other examples, the rotating structure can have more than three wings. In the example illustrated, the wings 3, 40, 4 are shown evenly distributed about the shaft, located at 9 o'clock, 1 o'clock and 5 o'clock positions, respectively. The wing 40 consists of a wing frame 41, a door frame 42 and sail 43. The door frame 42 together with the sail 43 constitutes a door 45. The door 45 includes a stopper 46. Operation of the rotating structure can be the same as described above. Although it is expected that wind pressure will cause the door 45 at the 1 o'clock position to open away from the stopper 46, it may still remain closed because of the inertia of the door moving from the 9 o'clock position to the 1 o'clock position. The rotating structure can continue to rotate in the clockwise direction. The rotation can be reversed by adjusting the stopper positions.

Referring to FIG. 6, an exemplary fluid turbine apparatus is shown generally at reference numeral 200. The apparatus 200 can be an enlarged version of the apparatus 100. Although only wings 3, 4 are shown, a plurality of wings can be attached to the shaft 6.

As discussed herein, a single door per wing concept for a large apparatus may not be practical. For a large apparatus, the weight of the doors can become heavy and it can be difficult to maneuver such doors. To overcome the problems, a large number of smaller doors can be used for a wing, as illustrated. The doors will each close and open in a similar manner to what was described for the apparatus 100. Using a large number of doors within a wing, in some examples, it is possible for the apparatus 200 to have a door surface area on the order of thousands of square feet for capturing the wind force.

Within each frame, the doors 10 can be arranged as described with a single door in a frame of the apparatus 100. For multiple doors within a single frame, each of the doors need not be of equal shape or of a particular shape as long as the wings of both sides of the shaft are balanced. This allows flexibility in design for maximizing the wind-catching area of the apparatus. In the example illustrated, the wing frame 7 is further strengthened by intermediate members 50.

Figure 7:
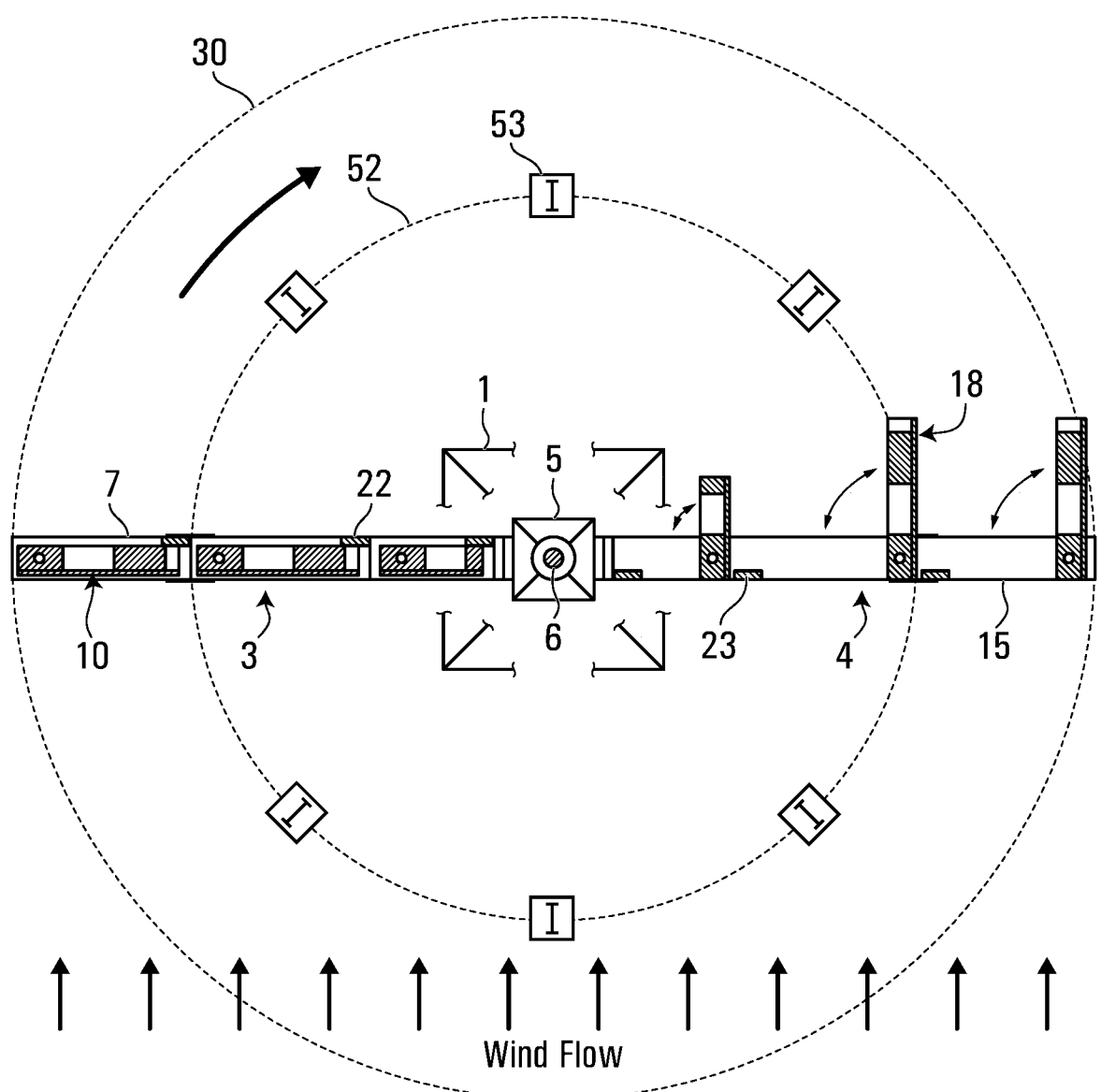
FIG. 7 is a sectional view of the fluid turbine apparatus of FIG. 6, in which a rotating structure is arranged to move in clockwise rotation.

Furthermore, for a large-scale apparatus, the weight of the wings can be too heavy to be supported by a support tower alone. In some examples, as illustrated in FIGS. 6 and 7, the wings 3, 4 can be additionally supported from the ground by support wheels 51 moving on a rail 52 placed on a rail support structure 53. The rail 52 is spaced apart from extends about the central shaft 6. The wheels 51 can be located along a bottom edge of the wings 3, 4 and can be spring-loaded for appropriate support and traction. The rail support structure 53 can be elevated to the required height by columns.

For long length shafts, a number of intermediate supports like the bearings 24, 25 can also be used as required. Additional design features such as a fly wheel, brakes, etc., can be included for large-scale commercial implementations. These are not shown on the drawings. These features and other details for the mechanical design of the assembly can be selected appropriately.

Figure 8:
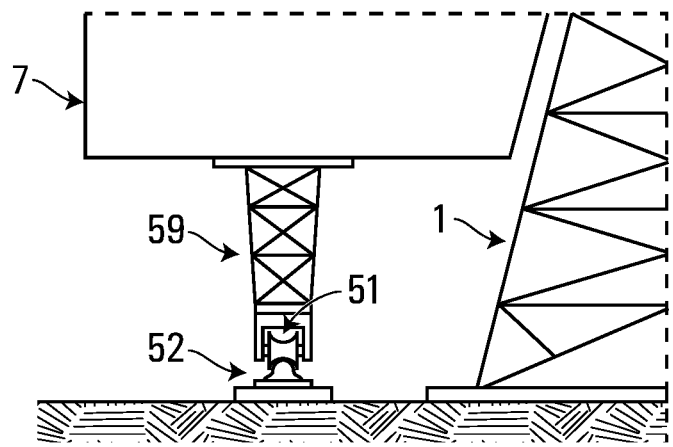
FIGS. 8, 9 and 10 are detailed views of the fluid turbine apparatus of FIG. 6.

Alternatively, as shown in FIG. 8, the rail 52 can be placed directly on the ground and the wings can be attached to the wheels 51 by a support 59. In general, although the wings 3, 4 are supported from the tower 1 by the connecting member 5 (see FIG. 6), supports from the ground can be considered when the wing span is large and the weight of the wings requires additional support.

Figure 9:
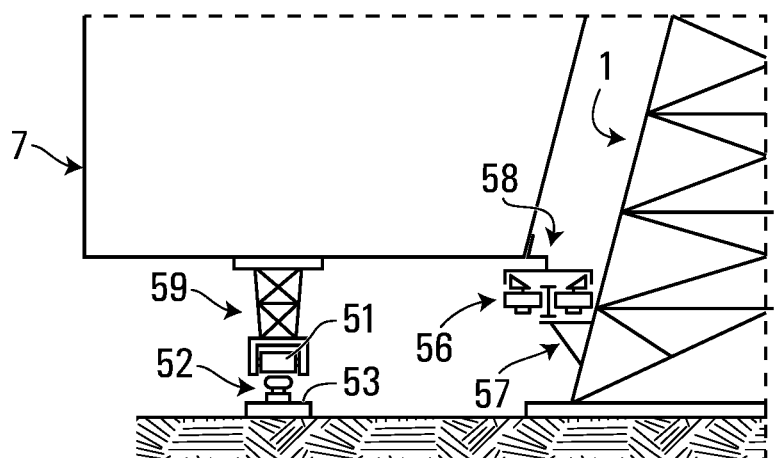

As shown in FIG. 9, to maintain proper alignment, guide wheels 56 can also be mounted to the wings by a bracket 58, and can be used so that the rotation of the wings is restrained around the guide member 57, which can be mounted around the base of the fixed structure 1.

Figure 10:
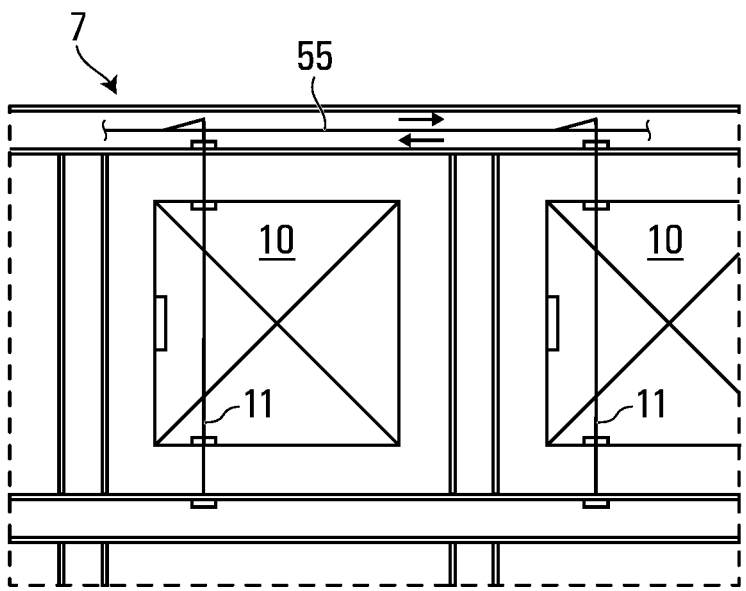

Referring to FIG. 10, to open or close doors at a same horizontal level in unison, a shutter mechanism 55 can be used.

Referring to FIG. 11, an exemplary fluid turbine apparatus is shown generally at reference numeral 300. The apparatus 300 can be a further enlarged version of the apparatuses 100, 200. In order to provide for a very large surface area of sails, wings are provided at multiple vertical levels so that they can be properly supported and guided. The doors can act to collect the wind forces on the doors at all of the different levels, and produce a resultant torque to rotate the central shaft.

Figure 12:
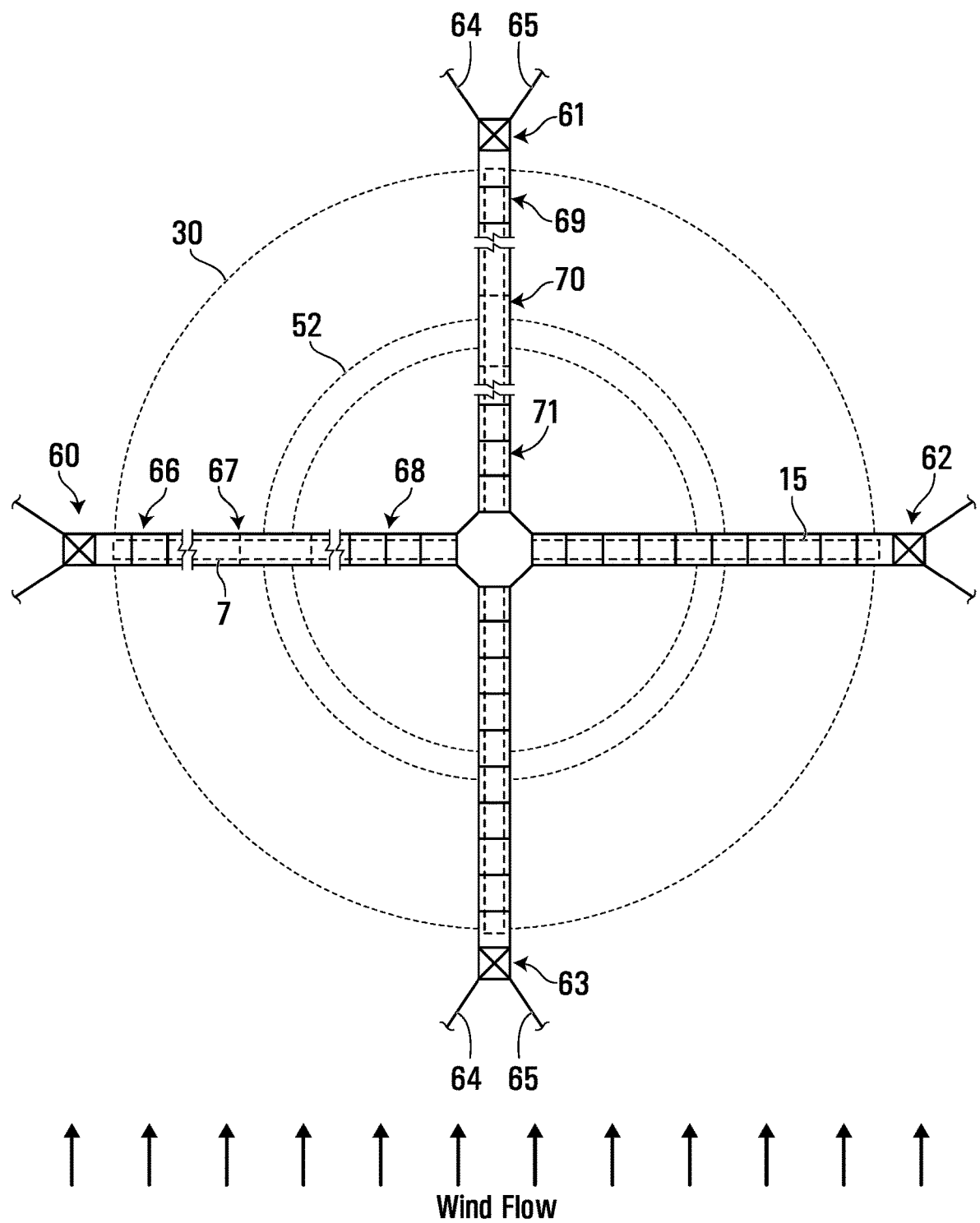
FIG. 12 is a sectional view of the fluid turbine apparatus of FIG. 11, in which a rotating structure is arranged to move in clockwise rotation.

Referring to FIGS. 11 and 12, the fixed structure is shown to include towers 60, 61, 62, 63 located at the periphery of the wings. Guy ropes 64, 65 can be used to stabilize the towers 60, 61, 62, 63. In the example illustrated, the towers 60, 62 are connected by bridges 66, 67, 68 at different elevations. Similarly, the towers 61, 63 are connected by bridges 69, 70, 71. The shaft 6 is supported at a center of the bridges 66, 67, 68, 69, 70, 71. The wing frames 7, 15 are connected to the central shaft 6 by the connecting member 5. The doors 10, 18 can operate the same way as described above. At each level, as shown, the wings frames can be additionally supported by support wheels 51 moving on a rail 52 on the bridges 66, 67, 69, 70.

The peripheral support towers 60, 61, 62, 63 and the bridges 66, 67, 68, 69, 70 and 71 can hinder the air flow directed to the wings. However, the projected area of these structures can be very small compared to the overall sail area, and thus will provide negligible impairment to the wind flow and operation of the doors.

The foregoing descriptions are exemplary and not intended to be limiting. Other implementations of the teachings of the present disclosure are possible. For example, the apparatus can be implemented to transmit mechanical or electrical power to ship propellers. Vehicles can also be powered by the apparatus for windsurfing on land. By combining and/or integrating solar cells with the apparatus, additional power can be derived from sunlight. Various configurations are possible in accordance with the teachings of the present disclosure.

In accordance with the second aspect, teachings herein can also be applied to generating power from water current in streams, rivers and oceans. The water current apparatuses can be similar to the wind power generating apparatuses described above. The apparatus can consist of two parts—a rotating structure and a fixed structure. The rotating structure can consist of two or more wings integrally connected to a vertical shaft. The shaft can be supported by the fixed structure, which permits the shaft to be rotated about its longitudinal axis.

The kinetic energy of water can be converted directly into rotational energy as the moving water exerts a force on the wing(s) facing the moving water, while the water passes through the open doors of the other wing(s), depending on their position. This imbalance in force can generate a torque for rotating the wings and the attached central vertical shaft. This vertical shaft can be connected to a power train with gear box, motor generator set, etc., which can be located on a barge or a fixed platform, and will generate mechanical or electrical power depending on the implementation.

As in the case with wind power generators, the wings can include doors that pivot eccentrically within door frames. The doors can be free to move within a range of motion. Water current impinging on the flat surface of the doors will convert the momentum of the water to generate a force, which, in turn, produces a torque to rotate all the wings and the integral vertical shaft.

For use in water, the doors can be made of lightweight materials constructed of plastic, metal, fiberglass, or other material selected for durability, strength and suitable for water chemistry and service.

The water current acts on the doors of a wing to close them at their stoppers, while the doors of the opposite wing will open because of the water current passing through that door uninhibited. Thus, a unidirectional torque will be created to rotate the entire rotating structure with the shaft. When two or more wings are used, a motive force will be produced at each wing depending on the position of the wing with respect the direction of water current. The forces will be combined to generate a torque to rotate the entire moving structure.

In some examples, for water power generation, all of the accessories, such as gear box, coupling, brakes, generator, etc., can be located on a platform above the water. The apparatus can be capable of accepting water current from any direction, thus no yawing or positioning mechanism will be required to align the apparatus to face the water current. The operation of the doors at each wing can be controlled by the water current itself, and no external mechanism will be required. The apparatus can also be capable of producing power even at low velocity of water streams.

In some examples, the apparatus can be installed in a river or stream that can continue to function normally. No dams will be required, while the apparatus can be located at a convenient point of the stream or river. For ocean currents, the apparatus can be located at a suitable location having regular and predictable water current available.

In some examples, the apparatus can be supported from a barge or another buoyant platform. Alternatively, for large-scale power generation, a self-supporting structure within the ocean, similar to an oil rig, can be erected.

In some examples, a relatively large surface area can be created with the doors, and, as a result, large amounts of power can be generated from the apparatus, depending on the source water currents and the limitations the local conditions may impose. It should be noted that the kinetic energy of moving air or water is directly proportional of the density of the fluid. Water is many times heavier than air per unit of volume (over 800 times), and therefore the power available from water current will be many times compared to wind power for the same available surface area of the wings, and for the same velocity of wind and water.

Teachings of the present disclosure can provide means to harness energy from a mass of moving water in naturally occurring streams, rivers and oceans, in harmony with the nature and without imposing undue restrictions on the normal usage of these natural resources. Clean mechanical and/or electrical power can be derived with readily available materials and construction technology available all over the world. The apparatus can be capable producing power in commercial proportions efficiently, and can maximize the extraction of power from the available energy of these sources of moving water.

Teachings of the present disclosure rely on the conversion of kinetic energy of the moving water by directly impinging the water on a rotation structure with wings, which are supported on a fixed structure. The rotating structure can include two or more wings integrally connected to a central shaft. As a result, the entire rotating structure can rotate as one piece with the shaft. If only two wings are used, they can be located diametrically opposite from one another relative to the central shaft. If more than two wings are used, they can be disposed spaced apart evenly about the central shaft.

In some examples, the wings can include doors configured to pivot about a vertical axis, eccentrically within a door frame. The pivot can be located towards the outer edge from the center line of the door. The door can be made of plastic, metal, fiberglass, or other materials selected to withstand the impingement of water on the surface and suitable for chemistry and durability under water.

In some examples, the doors are provided with door stoppers such that the door can only open away from the stopper. The stoppers are arranged such that the door at one end facing the flow of water is closed at the stopper with water force transferred to the door, while the door on the opposite side of the shaft opens away from the stopper along the direction of the water current. Positioning of the stoppers on the door frame will control clockwise or counterclockwise movement of the rotating structure. Water force acting on the closed doors on one side of the central shaft creates a torque that rotates the rotating structure. At the opposite wing, the water force will open the doors away from the stopper to allow the water to pass through the opened door, and no opposing torque will be created at the open door.

With the arrangement described above, the apparatus can face water current from any direction and the forces exerted on all the doors of the same wing are combined to provide a torque to rotate the entire structure. The opening and closing of the doors of each wing can be controlled by the water current itself and no additional positioning mechanism will be required.

In some examples, the wings can each consist of a plurality of doors, instead of a single large door for each wing. Each smaller door can be housed within its own frame. Stoppers are provided for each door and the operation will be same as described above. In such examples, construction, installation and operation of the rotating structure can be simpler and less expensive compared to a large single door that would otherwise be required for a wing having high surface area. A single door may also be too heavy to be supported on hinges, too heavy to be functional and can create enormous force on the stopper when water current closes the door. On the other hand, the cross-sectional area of multiple door frames can reduce the torque, and therefore the power produced can be slightly less compared to a single door design.

In some examples, the fixed and moving structures can be supported by a barge conveniently located and anchored within a river. The entire structure (moving and fixed) can be located under the barge, the central shaft can extend through the bottom of the barge, with proper seals and bearings, and the power train can be mounted on the barge deck. Thus, operation of the power train can be monitored and maintained from the barge.

In some examples, the apparatus can be submerged within a river or ocean along a known path for water current, and anchored at the location, similar to oil rigs, with the power train located on a platform above the water level.

The foregoing descriptions are exemplary and not intended to be limiting. Other implementations of the teachings of the present disclosure are possible. For example, a barge or ocean rig can be used to house a wind power generating apparatus above the barge, and a water current power generating apparatus below the barge. This can allow extraction of power from both wind and water current. By combining and/or integrating solar cells with the apparatuses, additional power can be derived from sunlight. Various configurations are possible.

Figure 13:
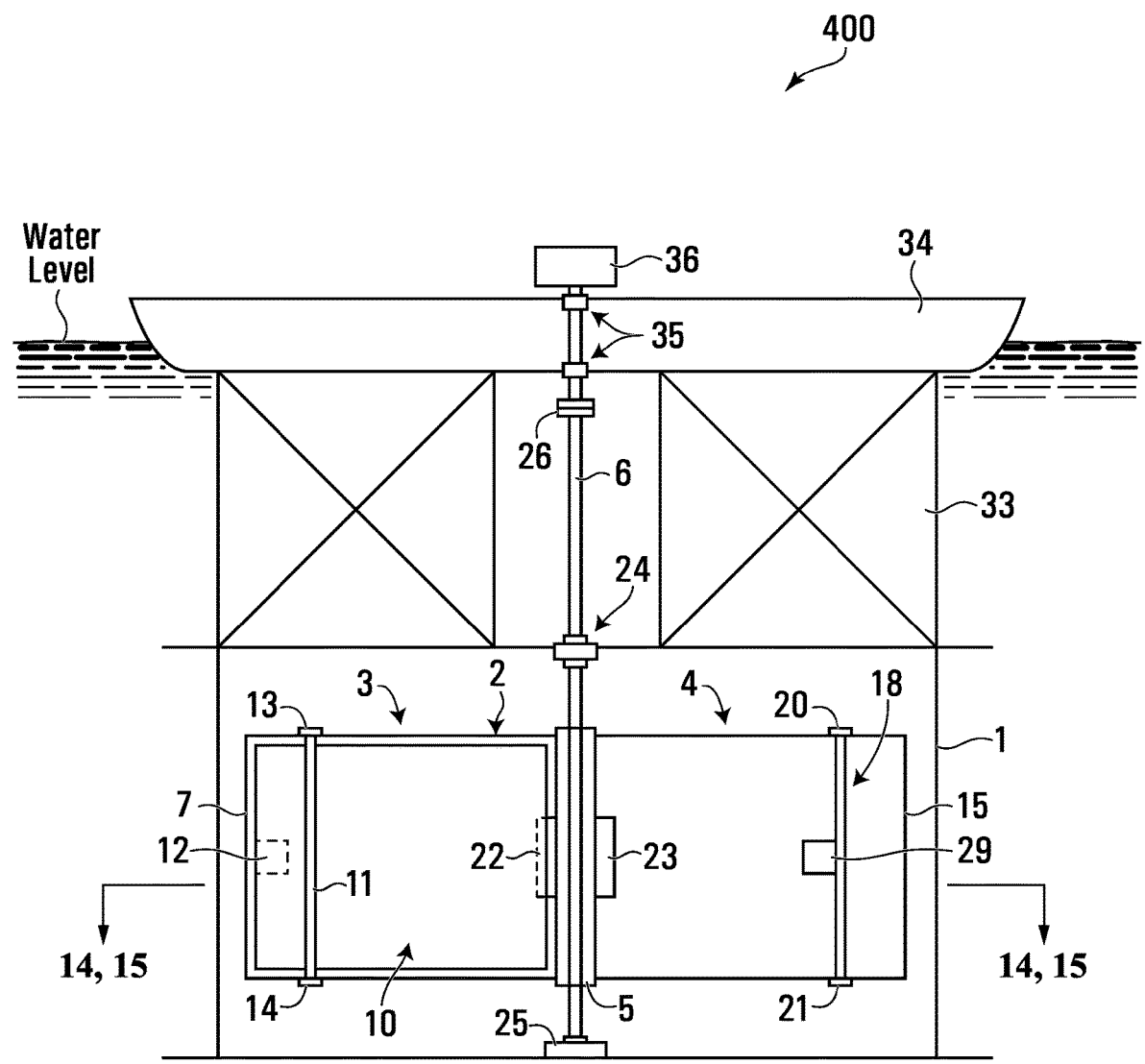
FIG. 13 is a schematic view of a fourth fluid turbine apparatus.
Figure 14:
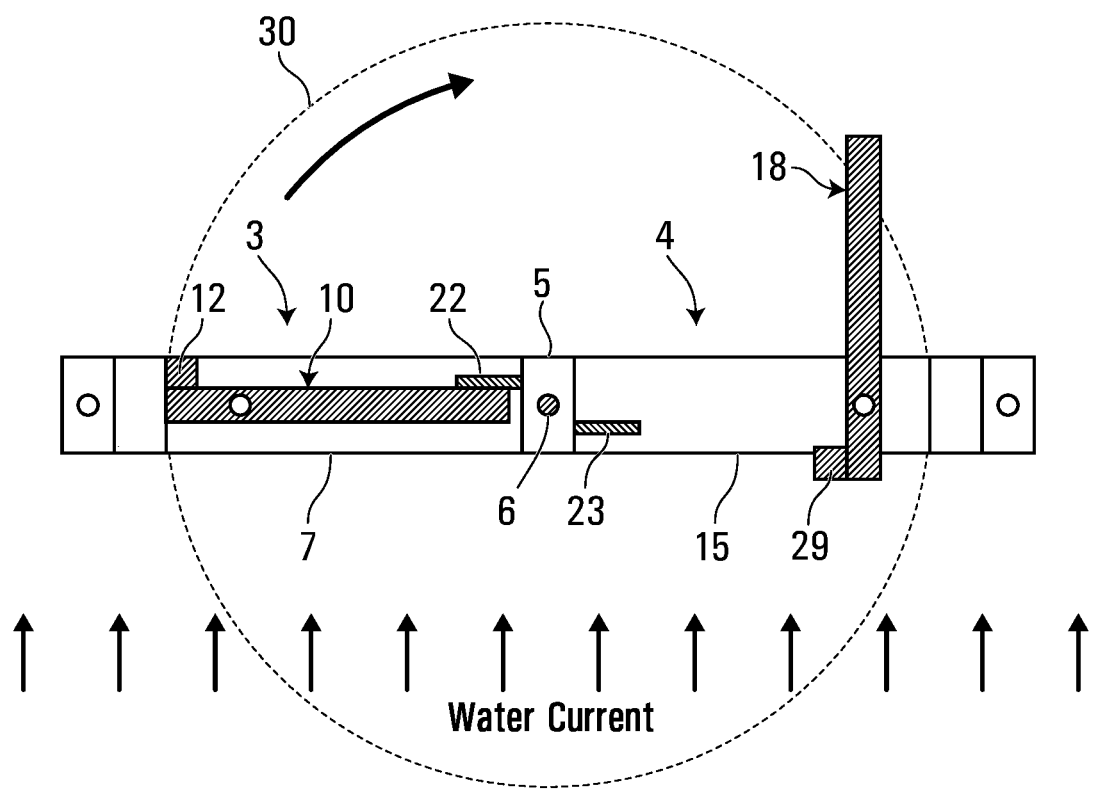
FIG. 14 is a sectional view of the fluid turbine apparatus of FIG. 13, in which a rotating structure is arranged to move in clockwise rotation.

Referring to FIG. 13, an exemplary fluid turbine apparatus is shown generally at reference numeral 400. The apparatus 400 can be used to extract power from a small stream and use the power for agricultural or other purposes. The apparatus 400 is shown to include a fixed structure in the form of a support tower 1, and a rotating structure 2. The rotating structure 2 is an integral assembly including wings 3, 4, a connecting member 5 and a shaft 6. The central shaft 6 is rotatable about a generally vertical shaft axis. The wings 3, 4 extend radially outwardly relative to the shaft 6, and are coupled to the shaft by the connecting member 5. FIG. 14 shows the wings 3, 4, the connecting member 5 and the shaft 6 arranged to move in clockwise rotation.

In the example illustrated, the support tower 1 is integrally connected to a structure 33 and a barge 34. The structure 33 is designed such that the tower 1, supporting the rotating structure 2, can be positioned at a desired depth where water current is most prevalent for maximizing the generation of power.

Referring to FIGS. 13 and 14, the wing 3 consists of a wing frame 7 and a door 10. In some examples, the door can consist of a door frame and a supporting skin covering the door frame to take impingement of water current. In the example illustrated, the door 10 can pivot within the wing frame 7 along a vertical door axis between an upper pivot 13 and a lower pivot 14. Similarly, the wing 4 consists of wing frame 15 and a door 18. For wing 4, the door 18 can pivot within the wing frame 15 along a vertical door axis between an upper pivot 20 and a lower pivot 21.

In the example illustrated, the door 10 includes a stopper 22, such that the door 10 can only open towards the reader (against the direction of water current flow), and the door 18 includes a stopper 23, such that the door 18 can only open away from the reader (with the direction of water current flow). The stoppers 22, 23 can be cushioned to absorb the impact of the doors 10, 18.

The shaft 6 can be integral with the wings 3, 4 and the connection member 5, and can be supported vertically by a bearing 24 at an intermediate location, and a thrust bearing 25 at the bottom of the fixed structure 1. In the example illustrated, the shaft 6 is connected via a coupling 26 and seals 35 at the bottom and top of the barge 34, and then connected to a power train 36 arranged above at the barge 34. Power can transmitted from the rotating structure 2 via the shaft 6 to the power train 36. In some examples, the apparatus 400 can also be used to generate mechanical power. The details of such electrical and/or mechanical transmission can be selected appropriately, depending on the implementation.

Referring to FIG. 14, the wing 3 is shown at a 9 o'clock starting position and the wing 4 is shown at 3 o'clock starting position. As the water current flows in the direction shown towards the apparatus 400, the door 10 located at one side of the central shaft 6 will engage the stopper 22 in a closed position. The door 18 located at the opposite side of the shaft 6 will be in an open position spaced away from the stopper 23 and can align with the direction of flow. The water force exerted on the door 10 generates a turning moment, which can cause the rotating structure to rotate in a clockwise direction having a circle of rotation 30. Because the door 18 is open and allows the water to pass through, no effective force is generated at this door to cause an opposite torque. Water current acting on the exposed edge of the door 18 will produce an anti-clockwise torque that will be very small compared to the clockwise torque produced at door 10. Water current force acting on wing frames 7, 15 can balance each other and not contribute to the torque produced.

As the doors 10, 18 move away from the starting positions, varying degrees of forces from the moving water exerted on the doors 10, 18 as well as momentum of the moving doors 10, 18 can cause continuous rotation of the entire moving structure in the clockwise direction. With 180 degrees of rotation, the positions of the wings 3, 4 will be reversed. The door 18 will now be shut closed and the door 10 will be open. This cycle can continue accordingly, as exposed surfaces of the doors 10, 18 in any position will catch the water current and cause the structure to rotate. Therefore, the apparatus 400 does not need any positioning mechanism to account for the water current direction.

The doors 10, 18 can be balanced within the frame 7, 15 along the pivoting axes with counter weights 12, 29, respectively. Balancing can make the doors 10, 18 more responsive at lower water velocities to orient to their respective positions. In the example illustrated, the pivoting axes are positioned eccentrically relative to the frames 7, 15, being closer to an outer edge than an inner edge. In some examples, the axes can be positioned approximately two thirds of the way from the inner edge to the outer edge of the doors. In some examples, the axes can be positioned as close as possible to the outer edge while at the same time permitting effective balancing of the doors along the vertical pivoting axis.

Figure 15:
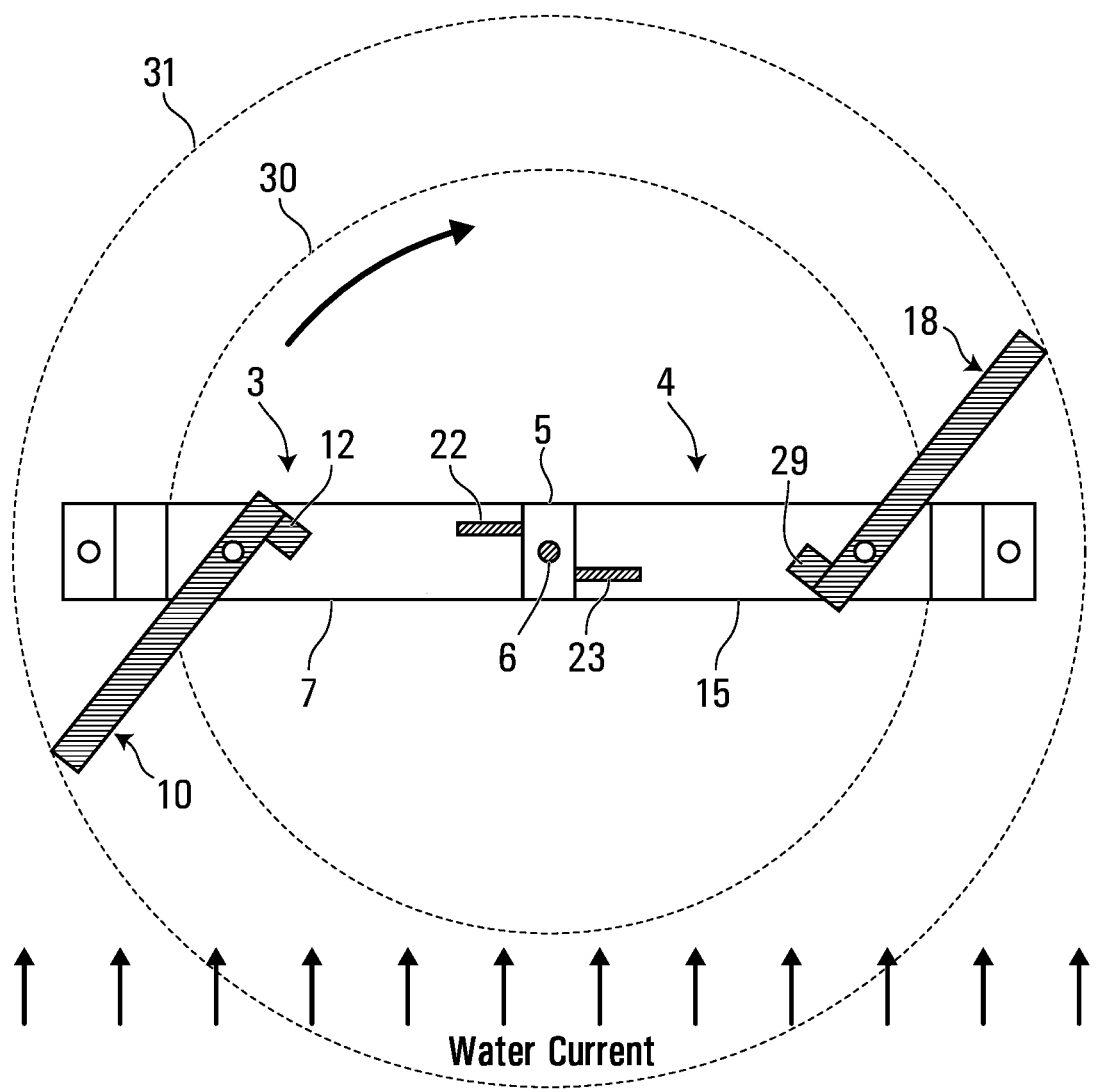
FIG. 15 is another sectional view of the fluid turbine apparatus of FIG. 13, showing alternate positions of doors of the apparatus.

FIG. 15 shows the door 10 in an alternative position. In use, strong and erratic water could swing the doors 10, 18 to the positions shown. Although the water will pass through the wing frame 7, the water force exerted on the door 10 will have additional leverage and can cause the rotating structure to rotate in a clockwise direction with an extended circle of rotation 31. The circle of rotation can be 30 or 31, depending on the water flow pattern. In some examples, appropriate stoppers can be used to limit the circle of rotation to 30.

Multiple wings can also be implemented for water power generation. In the example shown in FIG. 5, the rotating structure has three wings instead of two. In other examples, the rotating structure can have more than three wings, evenly distributed about the shaft.

Figure 16:
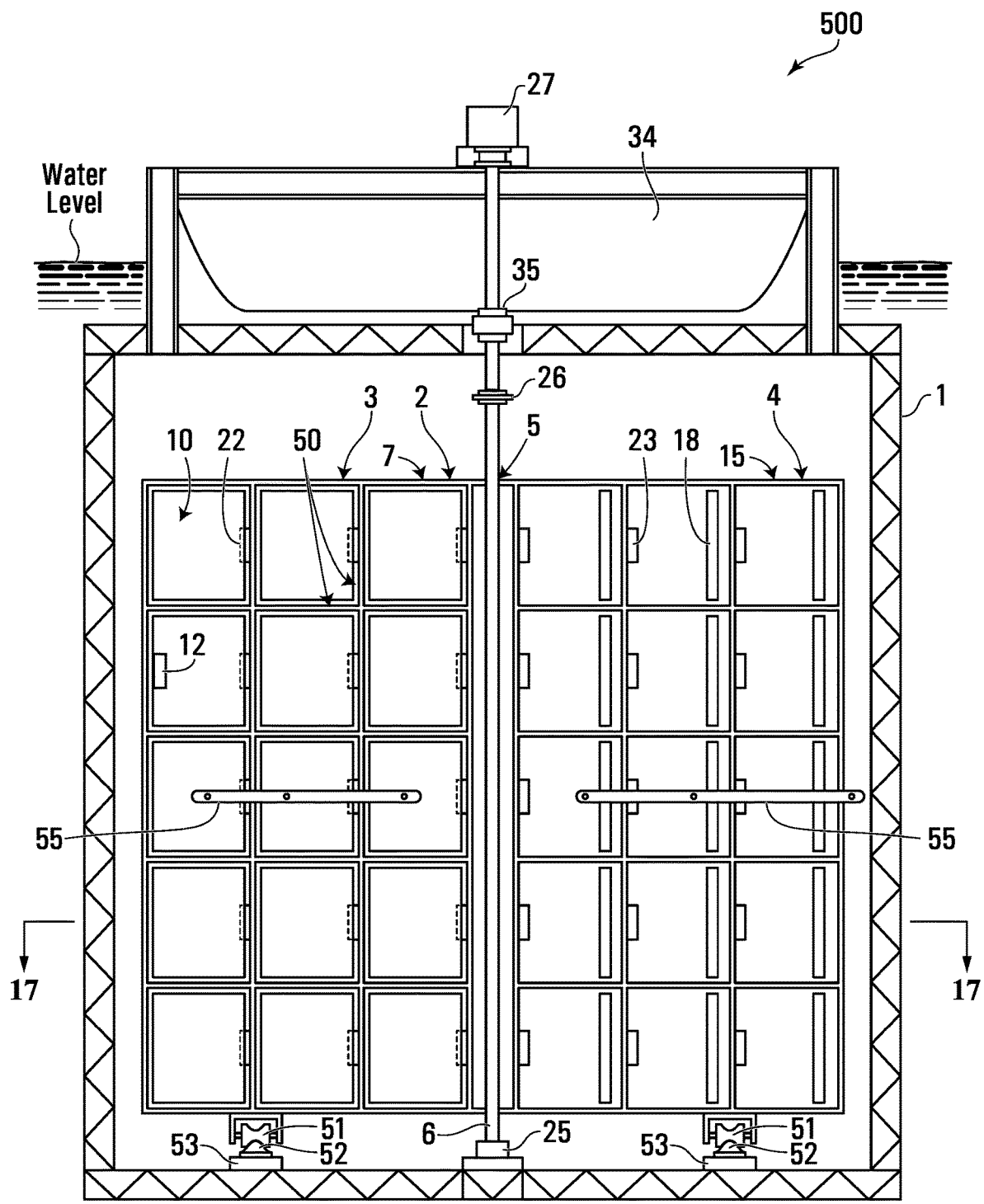
FIG. 16 is a schematic view of a fifth fluid turbine apparatus.

Referring to FIG. 16, an exemplary fluid turbine apparatus is shown generally at reference numeral 500. The apparatus 500 is an enlarged version of the apparatus 400. Although only wings 3, 4 are shown, a plurality of wings can be attached to the shaft 6.

As discussed herein, a single door per wing concept for a large apparatus may not be practical. For a large apparatus, the weight of the doors can become heavy and it can be difficult to maneuver such doors. To overcome the problems, a plurality of smaller doors can be used for a wing, as illustrated. The doors will each close and open in a similar manner to what was described for the apparatus 400. Using a large number of doors within a wing, in some examples, it is possible for the apparatus 500 to have a door surface area on the order of hundreds of square feet for capturing the water force.

Within each frame, the doors 10 can be arranged as described above. For multiple doors within a single frame, each of the doors need not be of equal shape or of a particular shape as long as the wings of both sides of the shaft are balanced. This allows flexibility in design for maximizing the water-catching area in an apparatus. In the example illustrated, the wing frame 7 is further strengthened by intermediate members 50.

Figure 17:
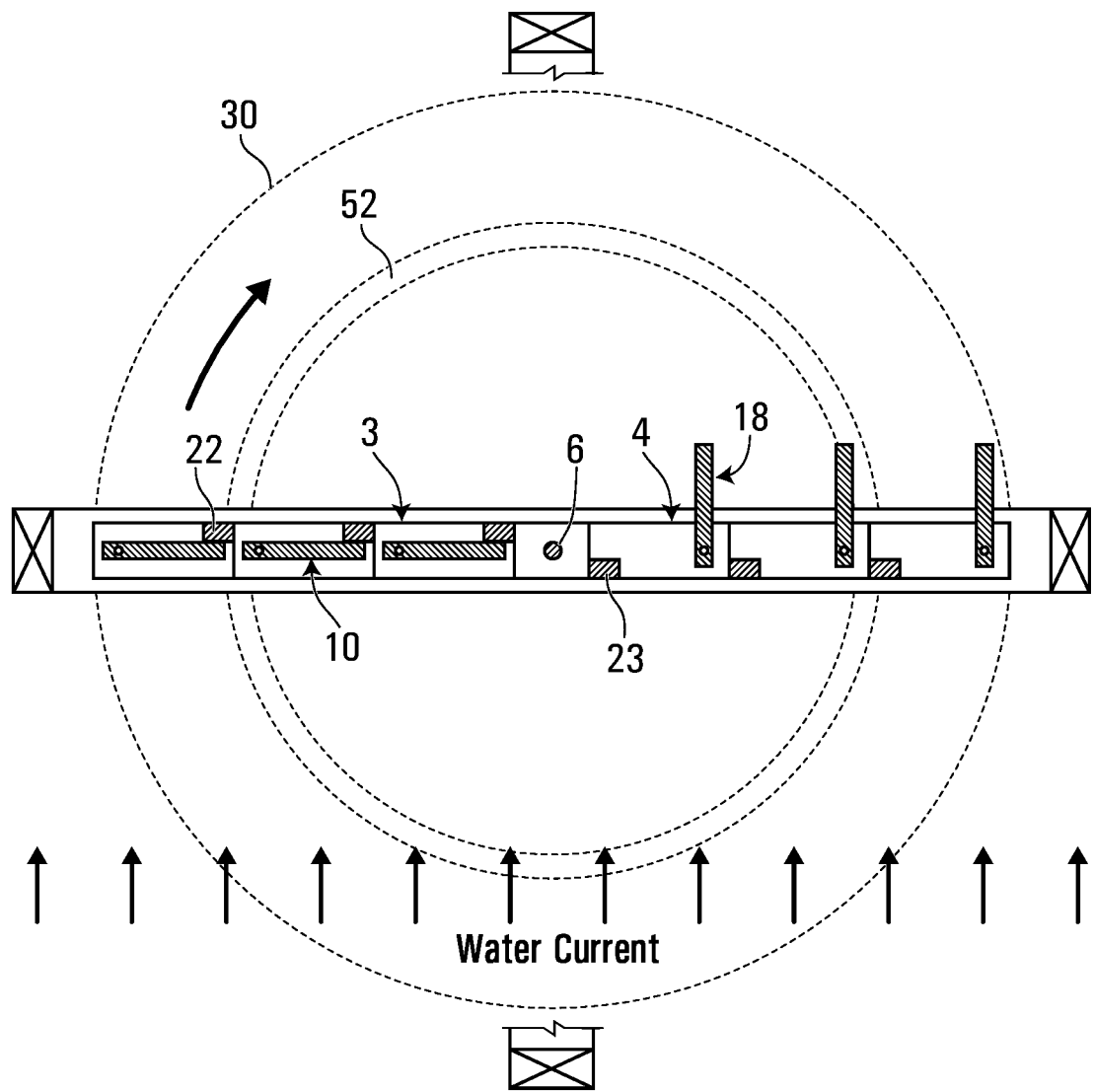
FIG. 17 is a sectional view of the fluid turbine apparatus of FIG. 16, in which a rotating structure is arranged to move in clockwise rotation.

Furthermore, for large-scale apparatuses, the weight of the wings can be too heavy to be supported through the shaft alone. In some examples, as illustrated in FIGS. 16 and 17, the wings 3, 4 can be additionally supported from the bottom support structure by support wheels 51 moving on a rail 52 placed on a rail support structure 53. The rail 52 is spaced apart from and extends about the central shaft 6, and the rail support structure 53 can be mounted to the fixed structure 1. The wheels 51 can be located along a bottom edge of the wings 3, 4 and can be spring-loaded for appropriate support and traction. The rail support structure 53 can be elevated to the required height.

To open or close doors at a same horizontal level in unison, a shutter mechanism 55 (see FIG. 10) can be used. Additional design features such as a fly wheel, brakes, etc., can be included for large-scale commercial implementations, and can be located on the barge 34. These are not shown on the drawings. These features and other details for the mechanical design of the assembly can be selected appropriately.

Figure 18:
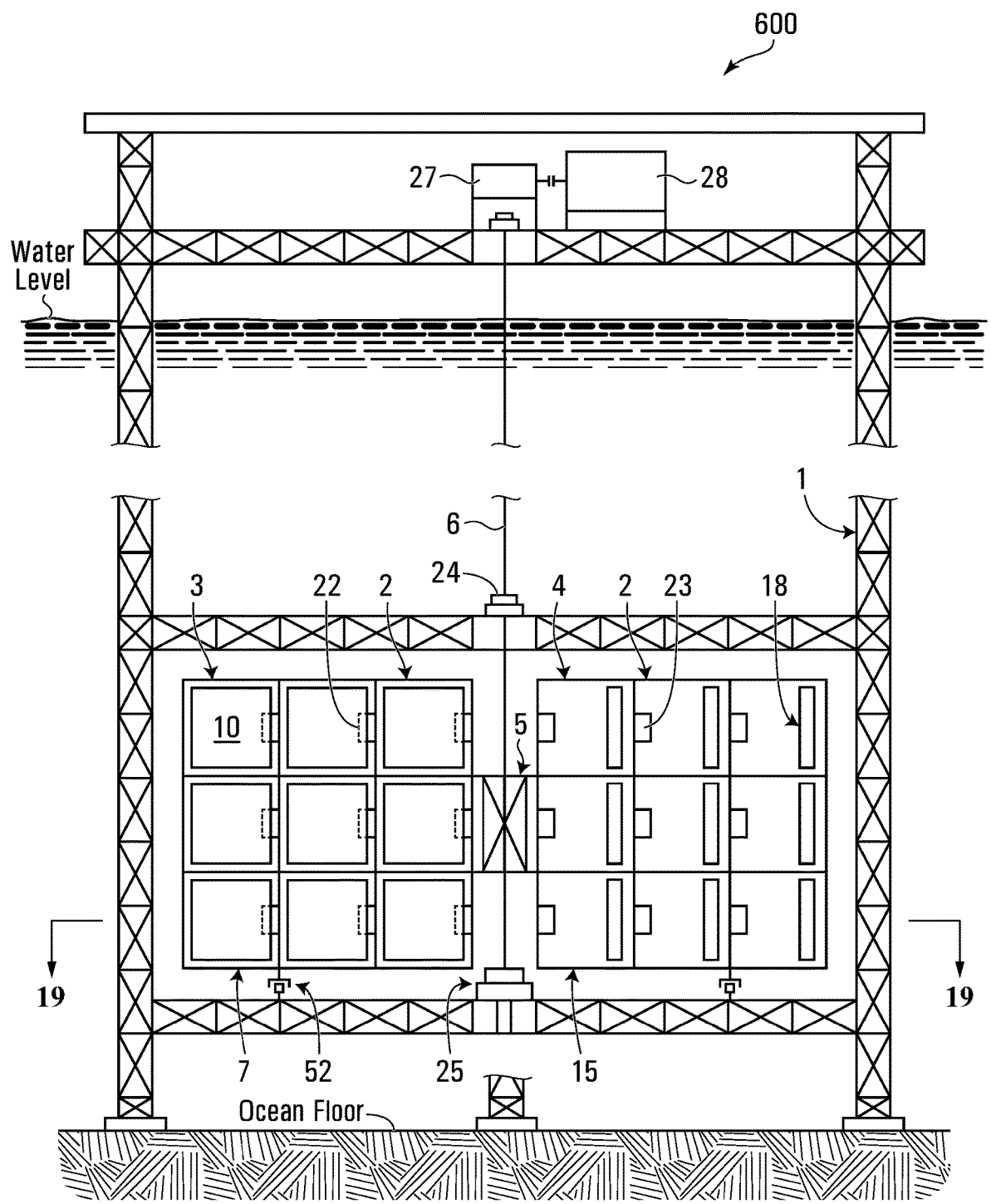
FIG. 18 is a schematic view of a sixth fluid turbine apparatus.
Figure 19:
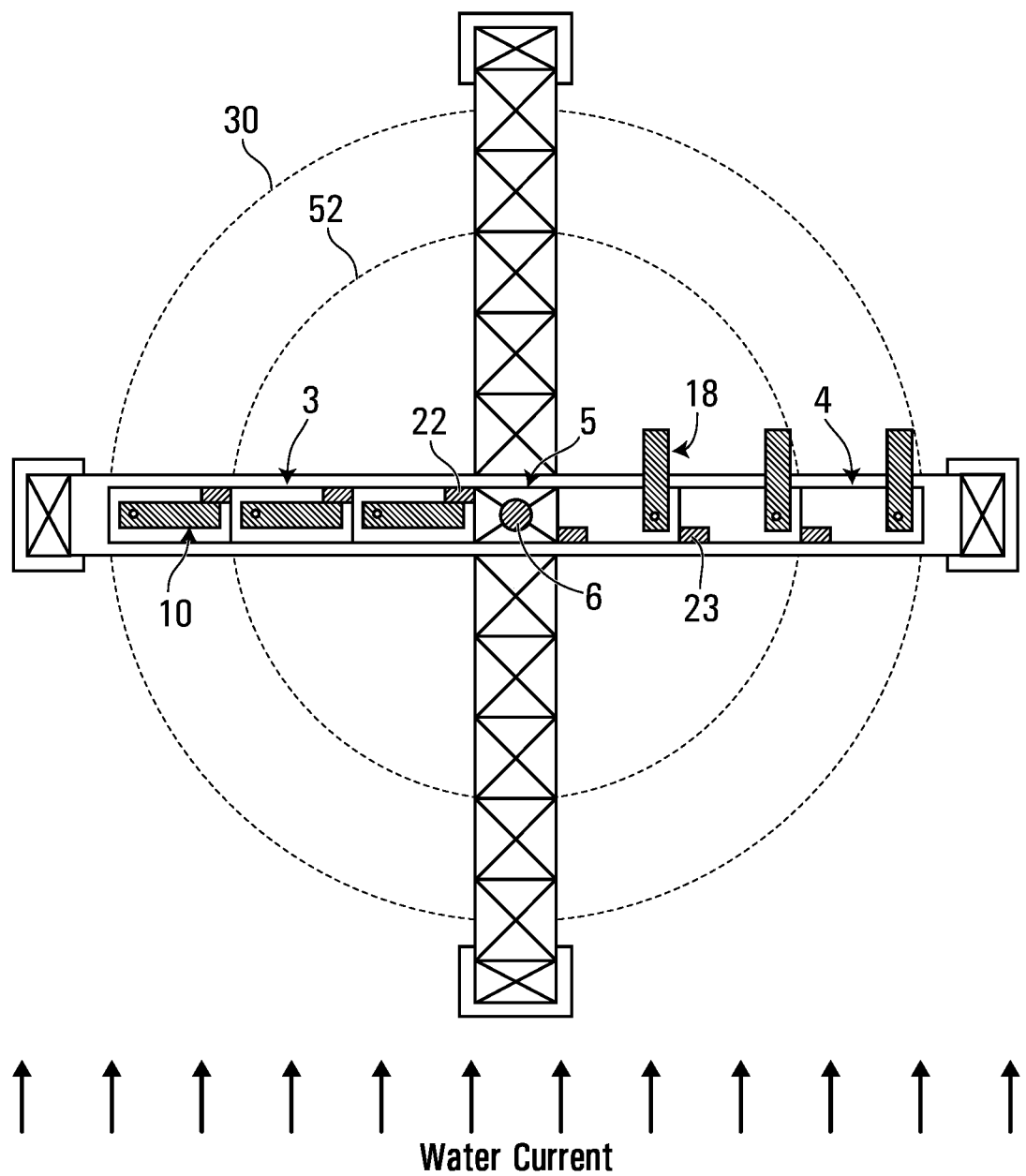
FIG. 19 is a sectional view of the fluid turbine apparatus of FIG. 18, in which a rotating structure is arranged to move in clockwise rotation.

Referring to FIG. 18, an exemplary fluid turbine apparatus is shown generally at reference numeral 600. The apparatus 600 is a further enlarged version of the apparatuses 400, 500, suitable for large-scale water power generation, and can be located on the ocean floor. In order to provide for a very large surface area of doors, wings are provided at multiple vertical levels so that they can be properly supported and guided. In the example illustrated, the wing frames at each level are supported by wheels moving on tracks 52. Velocity of the water current may vary by depth. The doors can act to collect the water current forces on the doors at all of the different levels, and produce a resultant torque to rotate the central shaft.

The shaft 6 can be integral with the wings 3, 4 and the connection member 5, and can be supported vertically by a bearing 24 at an intermediate location, and a thrust bearing 25 at the bottom of the fixed structure 1. In the example illustrated, the shaft 6 is connected to a power train including a gear box 27 and a motor generator 28 for electrical power. Power can transmitted from the rotating structure 2 via the shaft 6 to the motor generator 28. In some examples, the apparatus 600 can also be used to generate mechanical power. The details of such electrical and/or mechanical transmission can be selected appropriately, depending on the implementation.

The fixed structure can hinder water flow directed to the wings. However, the projected area of these structures can be very small compared to the overall surface area of the doors, and thus will provide negligible impairment to the water current flow and operation of the doors.

Terms used herein to convey geometrical or mathematical relationships need not be construed with absolute precision. For example, the term 'vertical' as used herein need not be interpreted to mean a direction or plane containing the exact local gravity direction, and the term 'horizontal' need not be interpreted to mean a direction or plane that is exactly perpendicular to the vertical direction. These terms and other terms herein may be interpreted with some flexibility, without strict adherence to mathematical definitions, as will be appreciated by persons skilled in the art.

While the above description provides examples of one or more apparatuses and/or methods, it will be appreciated that other apparatuses and/or methods may be within the scope of the accompanying claims.

I claim:

1. A turbine apparatus for use with a fluid carrying kinetic energy, the apparatus comprising:
   a fixed structure; and
   a rotating structure supported by the fixed structure, the rotating structure comprising a central shaft rotatable about a generally vertical shaft axis, and at least two wings connected to the central shaft and extending radially outwardly therefrom, each of the wings comprising a wing frame, at least one door and a respective at least one door stopper, wherein each of the doors is configured to pivot relative to the respective wing frame between a closed position in which the door engages the respective door stopper and an open position in which the door is spaced away from the respective door stopper, wherein the door stoppers are arranged such that the door located at one side of the central shaft facing a flow of fluid is in the closed position with fluid force transferred to the door, while the door located at the opposite side of the central shaft is in the open position with fluid passing through the respective wing frame, wherein the fluid force acting on the door at the one side creates a torque that rotates the central shaft, wherein the fixed structure comprises a rail spaced apart from and extending about the central shaft, and a guide member mounted around a base of the fixed structure, wherein the rotating structure comprises support wheels and guide wheels, wherein each of the wings comprises one of the support wheels located along a bottom edge of the respective wing, the support wheel vertically supporting the wing moving on the rail, and wherein each of the wings comprises at least one of the guide wheels mounted to the wing, the guide wheel horizontally restraining the wing in rotation by the guide member.

2. The apparatus of claim 1, wherein the at least two wings comprise a first wing and a second wing that are located diametrically opposite one another relative to the central shaft.

3. The apparatus of claim 1, wherein the at least two wings comprise a plurality of wings disposed spaced apart about the central shaft.

4. The apparatus of claim 1, wherein the door is configured to pivot within the wing frame along a generally vertical door axis between an upper pivot and a lower pivot.

5. The apparatus of claim 4, wherein the vertical door axis is positioned eccentrically relative to the wing frame.

6. The apparatus of claim 5, wherein the vertical door axis is arranged towards an outer edge of the door.

7. The apparatus of claim 6, wherein each of the doors comprises a counterweight arranged towards its outer edge for balancing the door along the vertical door axis.

8. The apparatus of claim 1, wherein each of the doors comprises a door frame and a sail.

9. The apparatus of claim 1, wherein each of the wings comprises a plurality of the doors.

10. The apparatus of claim 1, wherein the fixed structure comprises at least one bearing that vertically supports the central shaft.

11. The apparatus of claim 1, wherein the fixed structure comprises a plurality of towers located at the periphery of the wings, and the fixed structure comprises a plurality of bridges connected between the towers.

12. The apparatus of claim 11, wherein the at least two wings comprise at least two wings arranged at different vertical levels, the bridges are arranged at different elevations corresponding to the levels, and at each level, the wing frames are supported by support wheels moving on a rail on the respective bridge.

13. The apparatus of claim 1, wherein the central shaft is coupled to a power train located underneath the apparatus, and the power train is located at ground level.

14. The apparatus of claim 13, comprising a pony motor connected with the powertrain to facilitate rotation of the wings through external power to overcome a starting inertia.

15. The apparatus of claim 1, wherein the central shaft is coupled to a power train located above the apparatus, and the power train is located on a barge or platform.

16. The apparatus of claim 1, wherein each of the wings comprises a pair of the guide wheels mounted to the wing, and the guide member is positioned laterally in between the pair of guide wheels.

17. The apparatus of claim 16, wherein each pair of the guide wheels is mounted to a lower inner corner of the respective wing by a bracket.

18. The apparatus of claim 1, wherein each of the door stoppers is cushioned to absorb impact of the doors moving to the closed position.

19. The apparatus in claim 1, wherein each of the door stoppers is configured for emergency disengagement so that the doors are permitted to open in the direction of the flow of fluid.

20. The apparatus of claim 1, wherein the fixed structure comprises a plurality of bearings that vertically support the central shaft.

* * * * *